United States Patent
Baccash et al.

(10) Patent No.: US 7,392,242 B1
(45) Date of Patent: Jun. 24, 2008

(54) QUERY COSTING IN A MULTIDIMENSIONAL DATABASE

(75) Inventors: Jonathan M. Baccash, Sunnyvale, CA (US); Igor Nazarenko, Sunnyvale, CA (US); Uri Rodny, Mountain View, CA (US); Ambuj Shatdal, Madison, WI (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 415 days.

(21) Appl. No.: 10/863,313

(22) Filed: Jun. 7, 2004

Related U.S. Application Data (60) Provisional application No. 60/548,198, filed on Feb. 27, 2004.

(51) Int. Cl.
*G06F 7/00* (2006.01)
*G06F 17/30* (2006.01)

(52) U.S. Cl. .................................... 707/3; 707/4; 707/5
(58) Field of Classification Search ................. 705/400; 707/2, 100, 200, 3, 4, 5
See application file for complete search history.

(56) References Cited

U.S. PATENT DOCUMENTS

| | | | | |
|---|---|---|---|---|
| 6,003,022 A | * | 12/1999 | Eberhard et al. | 707/2 |
| 6,330,552 B1 | * | 12/2001 | Farrar et al. | 707/2 |
| 6,353,826 B1 | * | 3/2002 | Seputis | 707/5 |
| 2003/0126143 A1 | * | 7/2003 | Roussopoulos et al. | 707/100 |
| 2004/0167874 A1 | * | 8/2004 | Chong et al. | 707/2 |

OTHER PUBLICATIONS

Harinarayan, Venky, et al., "Implementing Data Cubes Efficiently", Sigmod Conference 1996: 205-216, pp. 1-25, http://www.informatik.uni-trier.de/~ley/db/conf/sigmod/HarinarayanRU96.html.

Nadeau, Thomas P., "Achieving Scalability in OLAP Materialized View Selection", http://www.cis.drexel.edu/faculty/song/dolap02/presentation/DOLAP02-nadeau..ppt.

Naduea, T. et al., "Achieving Scalability in OLAP Materialized View Selection", Nov. 8, 2002, 7 pages, *DOLAP*, McLean, Virginia USA.

\* cited by examiner

*Primary Examiner*—Sam Rimell
*Assistant Examiner*—Jared M Bibbee
(74) *Attorney, Agent, or Firm*—Hickman Palermo Truong & Becker LLP (57) ABSTRACT

The cost of running a query (having a query range) on a multidimensional database may be estimated using a process factors criteria beyond merely the number of affected records. First, a materialized view of the database may be represented as a container of tuples, sorted by key. Then keys may be stepped through, each key representing a mapping of a combination of tuples from the container. At each step, the process may request the next smallest key in the query range greater than or equal to the key of the current step, which results in the tuple in the database whose key is the smallest, greater than or equal to the requested key, and determine if the resulting tuple is in the query range. The cost of the query may then be estimated as the number of tuples upon which the range check was performed.

8 Claims, 9 Drawing Sheets

QUERY COSTING IN A MULTIDIMENSIONAL DATABASE

CROSS-REFERENCE TO RELATED APPLICATION

The present invention claims priority based on provisional patent application Ser. No. 60/548,198, entitled "QUERY COSTING IN A MULTIDIMENSIONAL DATABASE", by Jonathan Baccash, Igor Nazarenko, Uri Rodny and Ambuj Shatdal, filed on Feb. 27, 2004.

FIELD OF THE INVENTION

The present invention relates to the field of computer databases. More specifically, the present invention relates to the estimating a cost of a query in a multidimensional database.

BACKGROUND OF THE INVENTION

Database applications are commonly used to store large amounts of data. One branch of database applications that is growing in popularity is Online Analytical Processing (OLAP) applications. OLAP involves the use of computers to extract useful trends and correlations from large databases of raw data. It may involve consolidating and summarizing huge databases containing millions of items (e.g., sales figures from all branches of a supermarket chain) and making this data viewable along multidimensional axes, while allowing the variables of interest to be changed at will in an interactive fashion. As such, the processing and memory load on OLAP servers is very high.

Typically, a multidimensional database stores and organizes data in a way that better reflects how a user would want to view the data than is possible in a two-dimensional spreadsheet or relational database file. Multidimensional databases are generally better suited to handle applications with large volumes of numeric data and that require calculations on numeric data, such as business analysis and forecasting, although they are not limited to such applications.

A dimension within multidimensional data is typically a basic categorical definition of data. Other dimensions in the database allow a user to analyze a large volume of data from many different perspectives. Each dimension may have a hierarchy associated with it. For example, a product group dimension may have a sublevel in the hierarchy that includes entries such as drinks and cookies. The drinks entry may then have its own sublevel of individual product identifiers for each type of drink sold. Each hierarchy may have any number of levels.

For each event, measures may be recorded. In a sales example, this may include sales amount, product identifier, location of purchase, etc. This raw information is known as input level data. This data may be stored in a multidimensional cube. This cube may be extremely large given the number of dimensions and variables typical to businesses, but it may also be extremely sparse, in that there are large gaps where no information is stored. This is because only a small percentage of the possible combinations of variables will actually be used (e.g., no customer is going to purchase every single item in stock over their lifetime, let alone in a single day).

Users typically will issue queries to the database in order to get information they want or need. These queries will typically ask for a summary of data across certain dimensions. In many applications, querying a single cell in the database is rarely needed, as the user typically would not be interested in that fine a detail. For example, in a supermarket chain database, a user may be interested in overall sales for various stores in the month of January, or sales of a certain soft drink in the Southwest over the last year, but they would probably not be interested in how much of a particular product a single customer bought on a single day.

In a relational database, these queries are executed dynamically at runtime, at which point the appropriate data is aggregated. While this method requires the least amount of dedicated storage space, it can be slow, especially as the size of the cube increases. Users typically aren't willing to allow a significant amount of time to run a query.

One solution is to pre-run every single possible query, and materialize the results on disk. While this certainly reduces runtime delays, for very large cubes it can take up a significant amount of memory and processing power. In fact, for cubes typical in many businesses, such a solution would require years of processing time, which is obviously impractical.

Therefore, it is beneficial to materialize only those queries where the benefit of materialization outweighs its costs. As the number of candidate queries for materialization is exorbitant, the queries are typically organized into groups called views. A view is the set of all 1-cell queries such that for each dimension, each query requests information at the same level in the hierarchy. A decision must therefore be made as to which views should be materialized. A key to this decision is knowing how long a particular query will take to execute.

One abstract solution proposed to estimate how long a particular query will take to execute is to look solely at the number of "affected records", i.e., the number of existing and missing tuples in the materialized view that correspond to the tuples in the query view. While in the abstract this would appear to make sense, in actual practice it results in wildly incorrect estimations. This is due to many factors. One factor is that in real operation, only a small percentage of "affected records" would need to be examined when running a query, due to the sparsity of the data. Another factor is that the order in which the records are stored can have a dramatic effect on the speed at which a query is run. If for example, all of the required records are very close to each other, it may only require one page fetch in order to grab all of them. What is needed is a solution that provides for a better estimate of the time needed to run a particular query in a multidimensional database.

BRIEF DESCRIPTION

The cost of running a query (having a query range) on a multidimensional database may be estimated using a process factors criteria beyond merely the number of affected records. First, a materialized view of the database may be represented as a container of tuples, sorted by key. Then keys may be stepped through, each key representing a mapping of a combination of tuples from the container. At each step, the process may request the next smallest key in the query range greater than or equal to the key of the current step, which results in the tuple in the database whose key is the smallest, greater than or equal to the requested key, and determine if the resulting tuple is in the query range. The cost of the query may then be estimated as the number of tuples upon which the range check was performed.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
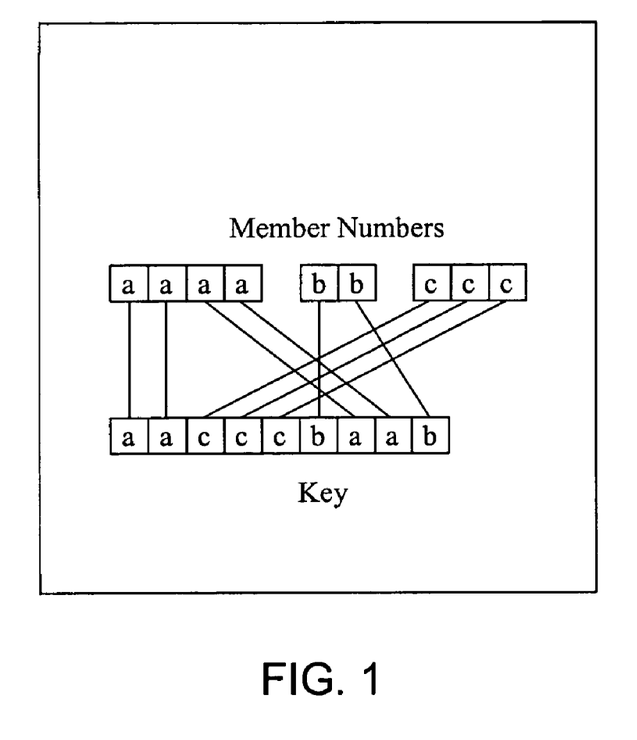
FIG. 1 is a diagram illustrating a mapping of member numbers to a key in accordance with an embodiment of the present invention.

In an embodiment of the present invention, each materialized view is stored as a B-tree of tuples. Every member for each dimension may have a unique member number. The keys of the tuples may be binary integers constructed from the bits on the member numbers. These member numbers may be combined into a single key representing the tuples. This is illustrated in FIG. 1. While a simplistic embodiment could have the member numbers simply concatenated together (in the example in FIG. 1, the key might be "aaaabbccc"), in many cases the member numbers may be interleaved together. These member number bits may be arranged in the key so that for each bit b of each member number m, every bit of m that is more significant than b is also more significant in the resulting key. In an embodiment of the present invention, how these bits are interlaced is taken into account when the cost of the query is estimated.

It should be noted that while an embodiment of the present invention utilizes a B-tree to store and/or represent the tuples, one of ordinary skill in the art will recognize that other structures may be used to accomplish the same result, and the claims should not be interpreted to be limited to B-tree implementations.

Each query constrains the set of tuples that need to be looked up. Whenever a query is executed, the B-tree may then be traversed using an algorithm similar to the following.

```
executeQuery(QueryBox Q)
{
    Key k = 0;
    while(k < maxKey(Q))
    {
        k = minKey(Q, k); // get smallest key in Q >= k
        Tuple t = findTuple(k);   // find smallest tuple in
                                   // cube with key >= k
        processTuple(Q, t);
        k = t.key + 1;
    }
}
processTuple(QueryBox Q, Tuple t)
{
    if (inRange(Q, t))
        addResult(t);
}
```

In an embodiment of the present invention, the estimated cost assigned to a specific query is proportional to the number of calls to processTuple( ).

In this discussion, it may be assumed that the number of children of every member is either 0 or a power of two, and the hierarchy of every dimension is perfectly balanced. It may further be assumed that the distribution of keys is random.

For every query that requests a tuple from a view that is not materialized, the system may potentially have to aggregate the results from the partial results located in some materialized view. For example, suppose only the level 0 view is materialized for the hierarchy illustrated in FIG. 2. Then if one wishes to compute the value for the tuple (2003, West), the process needs to add the values of the following tuples, which can be found in the materialized view: (Qtr1, West), (Qtr2, West), (Qtr3, West), (Qtr4, West).

Figure 2:
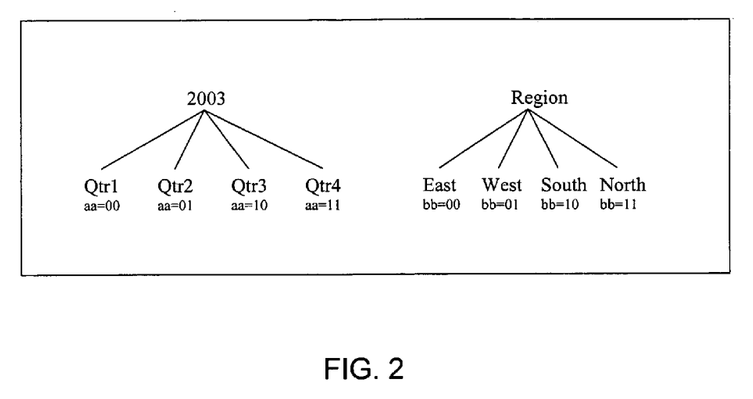
FIG. 2 is a diagram illustrating an example hierarchy in accordance with an embodiment of the present invention.

Suppose further the two bits (aa) of the 2003 dimension are more significant in the resulting key than the two bits (bb) of the Region dimension. Then the key map may be represented as "aabb". To answer the query, the values of the tuple with the following keys must be added together: 0001, 0101, 1001, and 1101. As can be seen, to determine if the tuple retrieved by findTuple( ) is in the query box, one can simply mask the tuple's key with 0011. If and only if the result is 0001, then this value must be added to the result.

Note that the view of the resulting tuple determined which bits of the source view's keys must be masked to perform the range check. In other words, the view of the resulting tuple determined which bits of the source view's key are fixed, and which bits are allowed to vary. Thus, a 1-tuple query can always be represented as a set of fixed (f) and variable (v) bits. The above query may be represented as "vvff".

There may be several different variations of the estimation process. Some of these variations will be discussed here. The first may be known as the Least Significant Bit (LSB) Query Cost method. This method moves from the least significant bit to the most significant bit. This is best illustrated by an example, which will be described in the text as well as in FIG. 3.

Figure 3:
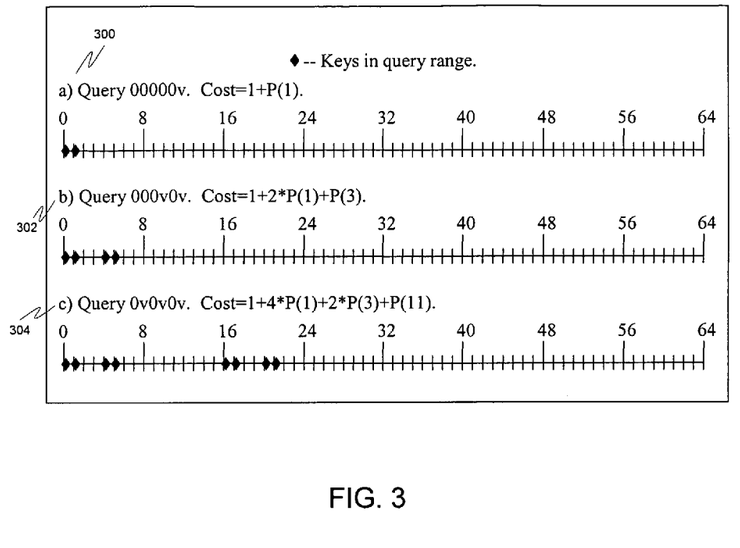
FIG. 3 is a diagram illustrating an example execution of an embodiment of the present invention.

Assume a query fffffv. Furthermore, assume the fixed bits are fixed at 0, so the query is 00000v. Reference a 300 in FIG. 3 illustrates this query. In order to answer the query, first the tuple 000000 must be looked up. Then, if 000000 exists, 000001 must be looked up. If P(n) is defined as the probability that at least one tuple exists in a range of n keys, then the cost here in processed tuples will be 1+P(1). This is due to the fact that 000000 must be looked up (hence the 1 processed tuple), and 000001 may need to be looked up, depending upon whether 000000 was found (hence the P(1)). This cost is the same no matter what the fixed bits equal.

The query may be complicated a bit by adding another variable bit, for example: fffvfv. Again, one may assume all fixed bits equal 0. Reference b 302 in FIG. 3 illustrates this query. First the tuple 000000 must be looked up. If it exists, then 000001 must be looked up. If a tuple in the range [000001, 000100] exists, then 000100 must be looked up. Finally, if tuple 000100 exists, then 000101 must be looked up. The cost here would then be 1+P(1)+P(3)+P(1), which can be simplified to 1+2*P(1)+P(3).

Figure 4:
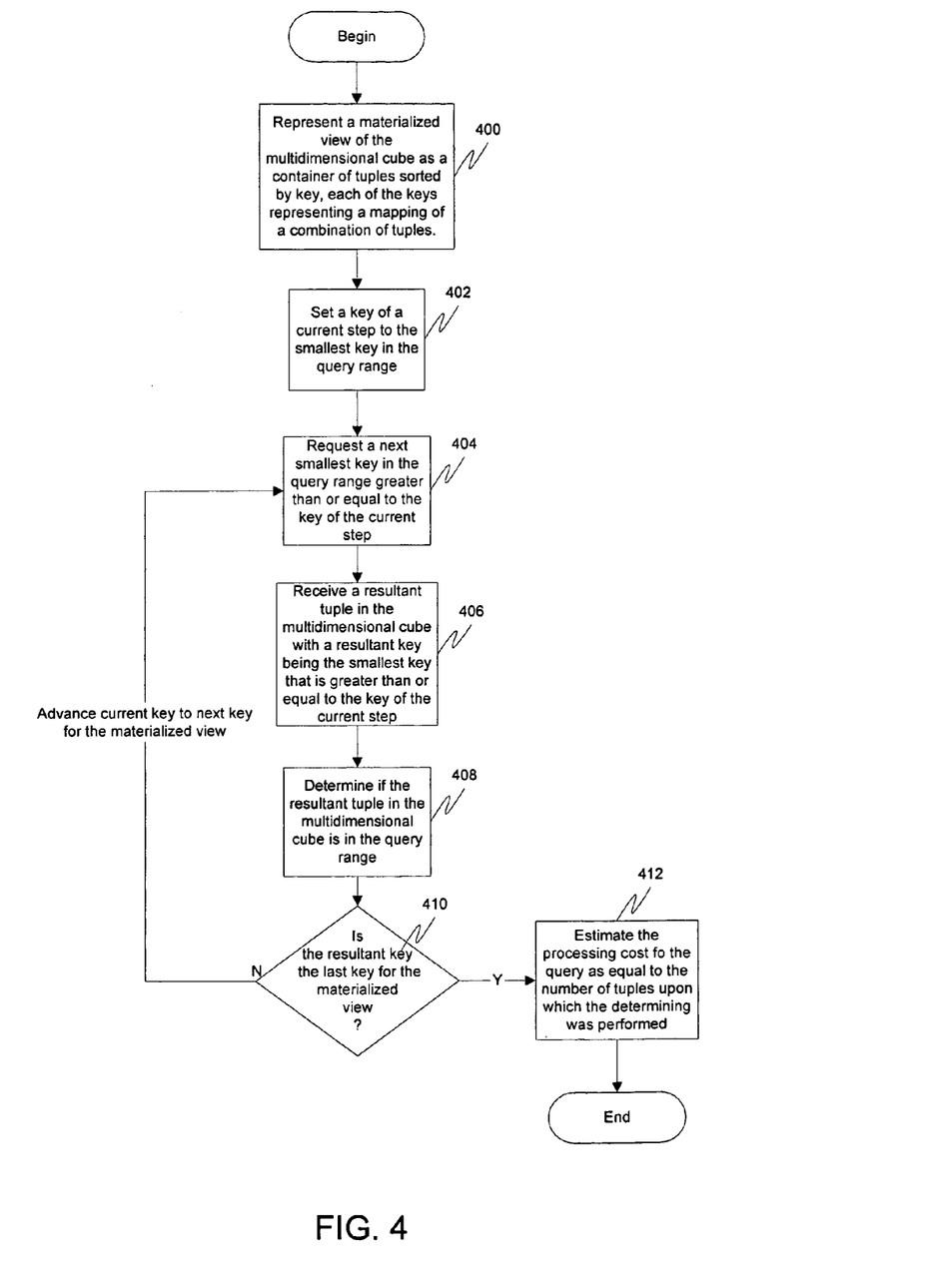
FIG. 4 is a flow diagram illustrating a method for estimating processing cost for a query on a multidimensional cube, the query having a query range, in accordance with an embodiment of the present invention.

Finally, looking at the query fvfvfv, depicted in reference c 304 in FIG. 4, the total cost here would be 1+4*P(1)+2*P(3)+P(11).

The results may be generalized as follows. First, the initial cost of a single search must be incurred no matter what. All the additional searches are "extra" searches. The process moves from the least significant bit to the most significant bit. Each time another variable bit is encountered, the expected number of extra searches may be multiplied by 2 and added to the probability that a tuple occurs in the range from the maximum key searched so far to the key $2^n$, where n is the current bit. In code, this may be written as:

```
expectedSearches(bits, bitCount, cellCount)
{
    return 1+expectedExtraSearches(bits, 0,
                                   bitCount, 0,
                                   cellCount, 0);
}
expectedExtraSearches(bits, n, bitCount,
                      maxSearchedKey, cellCount, result)
{
    if (n == bitCount)
        return result;
    if (bits[n] == v) // if it's a variable bit
    {
        result *= 2;
```

-continued

```
        range = 2^n-maxSearchedKey;
        result += P(range, bitCount, cellCount);
        maxSearchedKey += 2^n;
    }
    return expectedExtraSearches(bits, n+1, bitCount,
                                 maxSearchedKey,
                                 cellCount, result);
}
P(range, bitCount, cellCount)
{
    // cardenas is accurate for large ranges
    if (1 == range)
        return cellCount / 2^bitCount;
    else
    {
        rangeCount = 2^bitCount/range;
        return cardenas(rangeCount, cellCount) /
               rangeCount;
    }
}
cardenas(v, n)
{
    return v-v* (1-1/v)^n;
}
```

The calculation of P(0) here assumes a random distribution. A common formula known as Cardenas' formula may be used to approximate the expected number of ranges that are filled when the distribution is random and the size of a range is large.

In a second variation of the process, a weight for each bit in the query may be used, and thus this may be known as the Bit Weight Query Cost method.

For example, if the query is vfffff, then the keys will fall into two possible buckets: keys beginning with a 0 and keys beginning with a 1. Cardenas' formula may be used to determine the expected number of buckets that are filled, since this value is likely to be very close to 1 or very close to 2, the query cost may be approximated as simply cardenas(2, cellCount).

The query may be further complicated by adding another variable bit to get: vvffff. This time, there are four possible buckets. Using Cardenas' formula, the expected number of buckets that are filled can be arrived at by using cardenas(4, cellcount). Again, the number of processed tuples can be approximated as the number of filled buckets.

If the query is vvvfff, the approximate number of filled buckets may be cardenas(8, cellcount). This is the query cost.

This example may be made even more interesting by inserting a fixed bit to achieve: vfvfff. Of the four possible buckets created by the most significant two bits, cardenas (4, cellCount) of them are likely to be filled. Since cardenas (8, cellCount) 3-bit buckets are likely to be filled, there are likely cardenas(8, cellcount)/cardenas(4, cellcount) 3-bit buckets likely to be filled for each 2-bit bucket. However, because of the most significant variable bit, the cardenas (2, cellcount) two-bit buckets are all that is cared about. Therefore, the expected query cost is cardenas(2, cellcount)*cardenas(8, cellcount)/cardenas(4, cellcount).

In general, a weight may be associated with each bit of the key. The weight is cardenas $(2^{n+1}$, cellcount)/cardenas $(2^n$, cellcount), where n=0 for the most significant bit, n=1 for the next most significant bit, and so on. Then, to get the query cost, the weight of each variable bit may be multiplied.

The Bit Weight Query Cost method does have an advantage over the LSB method in that it is easier to refine the method to account for the possibility that some of the assumptions made earlier in this document are incorrect. The Bit Weight Query Cost method may be refined to account for the possibility of the inaccuracy of the assumption that the number of children of every member is either 0 or a power of two, and the hierarchy of every dimension is perfectly balanced. One refinement is called the grouping capacity refinement, and the other is called the bit count refinement. Both approaches employ an "effective bucket count" strategy. Normally, as the process moves from the most significant bit to the least significant bit in the Bit Weight Query Cost algorithm, the bucket count is multiplied by two for each new bit. Using the refinements here, the effective bucket count is actually multiplied by a number between 1 and 2, depending upon the various characteristics of the hierarchy.

In the grouping capacity refinement, it is known that each dimension may have one or more groupings, each of which is given n bits within the key. But the actual number of members at that grouping of the dimension is not necessarily reflected by the total number of possible combinations of the corresponding bits within the key. The process may calculate m, the average number of members in the grouping for every combinations of the other groupings in the dimension. The effective bucket count multiplier in this approach is equal to the 2 divided by the nth root of m.

The bit count refinement employs an effective bucket count strategy that attempts to account for members with children not a power of 2, as well as drastic imbalances in the hierarchy. In this approach, when the outline is initialized, a count c is maintained for every bit of every member number and is incremented by one for each level 0 member for which that bit was set. In a perfectly balanced hierarchy, each bit would have c equal to half the number of level 0 members m. Due to imbalances, c could be more or less than half m. It is assumed that the number of effective buckets increases by 2 each time the bit is set or unset, whichever occurs least frequently. For the remaining cases, the number of effective buckets is not increased. On average then, the number of effective buckets increases by m/max (c, m−c). This is the effective bucket count multiplier.

Cardenas' formula gives the number of distinct values for n values in v possible distinct values as $v-v*(1-1/v)^n$. In the context of query costing, the inputs v and n are often so large that double precision floating point arithmetic cannot accurately compute the correct answer.

The approximation $(1+e)^n \sim 1+n*e$ for small e and small n*e may be used. Furthermore, if v is much greater than n or n is much greater than v, the result can be approximated by the smaller of n and v. Thus, the Cardenas' formula may be implemented as follows.

```
double cardenas(double v, double n)
{
    if (v*16 < n)
        return v;
    if (n*16 < v)
        return n;
    double result = v-v*plusPow(-1.0/v, n);
    if (result > n)
        result = n;
    if (result > v)
        result = v;
    return result;
}
// return (1+e)^n
double plusPow(double e, double n)
{
    if (fabs(e) > .0000001)
        return pow(1+e, n);
    else if (e>0)
    {
```

-continued

```
        double newn = n*e/.0000001;
        return pow(1.0000001, n/newn);
    }
    else
    {
        double newn = n*e/-.0000001;
        return pow(.9999999, newn);
    }
}
```

FIG. 4 is a flow diagram illustrating a method for estimating processing cost for a query on a multidimensional cube, the query having a query range, in accordance with an embodiment of the present invention. Each act in the method may be performed by software, hardware, or any combination thereof. At 400, a materialized view of the multidimensional cube may be represented as a container of tuples sorted by key, each of the keys representing a mapping of a combination of tuples. The container may be a B-tree. Each member in each dimension of the multidimensional cube may have a unique member number, and the keys may be binary integers constructed from bits of member numbers. At 402, a key of a current step may be set to the smallest key in the query range. At 404, a next smallest key in the query range greater than or equal to the key of the current step may be requested, resulting in the tuple in the database with the smallest key that is greater than or equal to the key of the current step being received at 406. At 408, it may be determined if the resultant tuple is in the query range. At 410, it may be determined if the resultant key is the last key for the materialized view. If not, then the process may step to the next key in the query range and return to 404. If so, then at 410, the processing cost for the query may be estimated as equal to the number of tuples upon which the determining was performed, in other words, the number of times 408 was executed.

Figure 5:
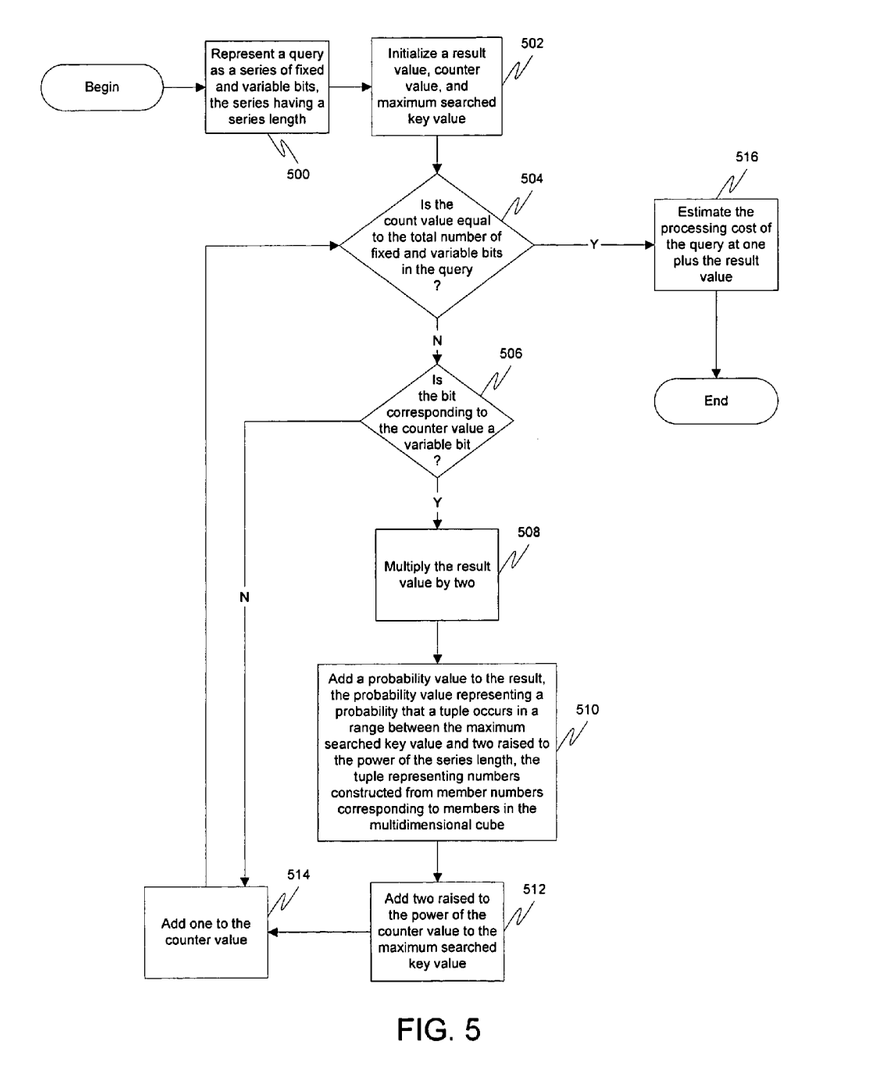
FIG. 5 is a flow diagram illustrating a method for estimating processing cost for a query on a multidimensional cube in accordance with another embodiment of the present invention.

FIG. 5 is a flow diagram illustrating a method for estimating processing cost for a query on a multidimensional cube in accordance with another embodiment of the present invention. Each act in the method may be performed by software, hardware, or any combination thereof. At 500, the query may be represented as a series of fixed and variable bits, the series having a series length. At 502, a result value, counter value, and maximum searched key value may be initialized. Then, for each fixed and variable bit, 504-512 may be performed. At 504, it may be determined if the counter value is equal to the total number of fixed and variable bits in the query. If so, the process may move to 514 and the loop may end. If not, then the process may move to 506, where it may be determined if the bit corresponding to the counter value is variable. If so, then the process may move to 508, where the result value may be multiplied by two. At 510, a probability value may be added to the result, the probability value representing a probability that a tuple occurs in a range between the maximum searched key value and two raised to the power of the series length, the tuple representing numbers constructed from member numbers corresponding to members in the multidimensional cube. The probability value may be based on the number achieved by subtracting the maximum searched key from two raised to the power of the counter value. Then, at 512, two raised to the power of the counter value may be added to the maximum searched key value. Then, at 514, one may be added to the counter value. 514 may be performed directly from 506 if it was determined that the bit corresponding to the counter value was not variable.

At 514, the processing cost of the query may be estimated at one plus the result value produced by the loop.

Figure 6:
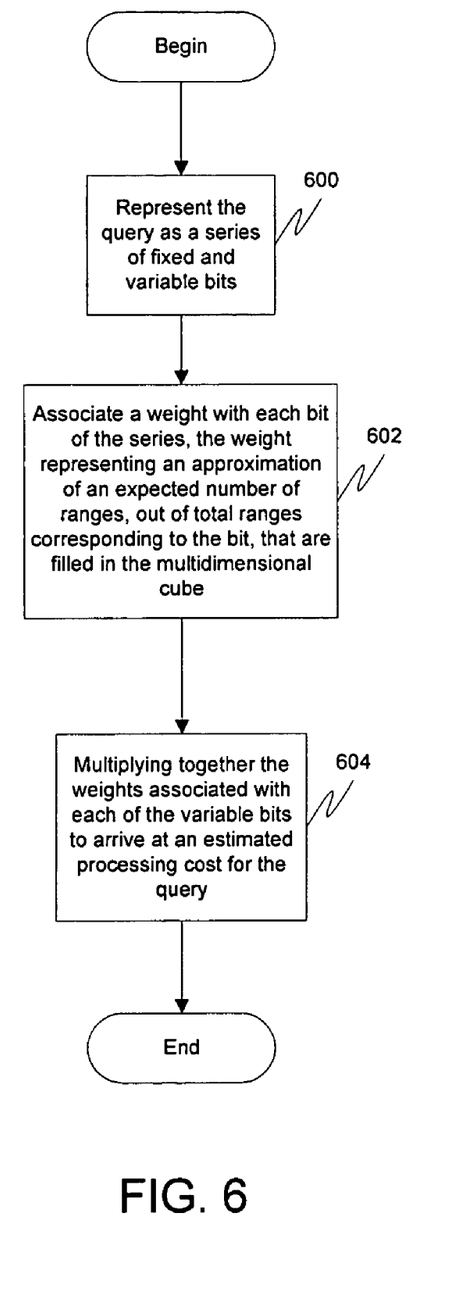
FIG. 6 is a flow diagram illustrating a method for estimating processing cost for a query on a multidimensional cube in accordance with still another embodiment of the present invention.

FIG. 6 is a flow diagram illustrating a method for estimating processing cost for a query on a multidimensional cube in accordance with still another embodiment of the present invention. Each act in the method may be performed by software, hardware, or any combination thereof. At 600, the query may be represented as a series of fixed and variable bits. At 602, for each bit of the series, a weight may be associated with the bit, the weight representing an approximation of an expected number of ranges, out of total ranges corresponding to the bit, that are filled in the multidimensional cube. The total number of ranges corresponding to a bit may be based on bit position. It may be equal to an effective bucket count corresponding to the bit. The effective bucket count for a bit may be equal to an effective bucket count for a previous bit, such as a next most significant bit of the series, multiplied by an effective bucket count multiplier. In a basic embodiment, the effective bucket count multiplier may simply be 2. In a grouping capacity embodiment, the effective bucket count multiplier may be equal to 2 divided by the nth root of m, wherein n is equal to a number of bits in the key which are given to each grouping in a dimension, and m is equal to an average number of members in each of the groupings. In a bit count embodiment, the effective bucket count multiplier may be equal to m divided by the maximum of c and m−c, wherein m is equal to a number of level 0 members in the multidimensional cube, and c is equal to a count c incremented by one for each level 0 member for which the corresponding bit of the series was set. The approximation of an expected number of ranges, out of total ranges corresponding to the bit, that are filled in the multidimensional cube may be equal to Cardenas' formula applied to an effective bucket count raised to the power of one plus a bit number for the bit, divided by Cardenas' formula applied to an effective bucket count raised to the power of said bit number for the bit. At 604, the weights associated with each of the variable bits may be multiplied together to arrive at an estimated processing cost for the query.

Figure 7:
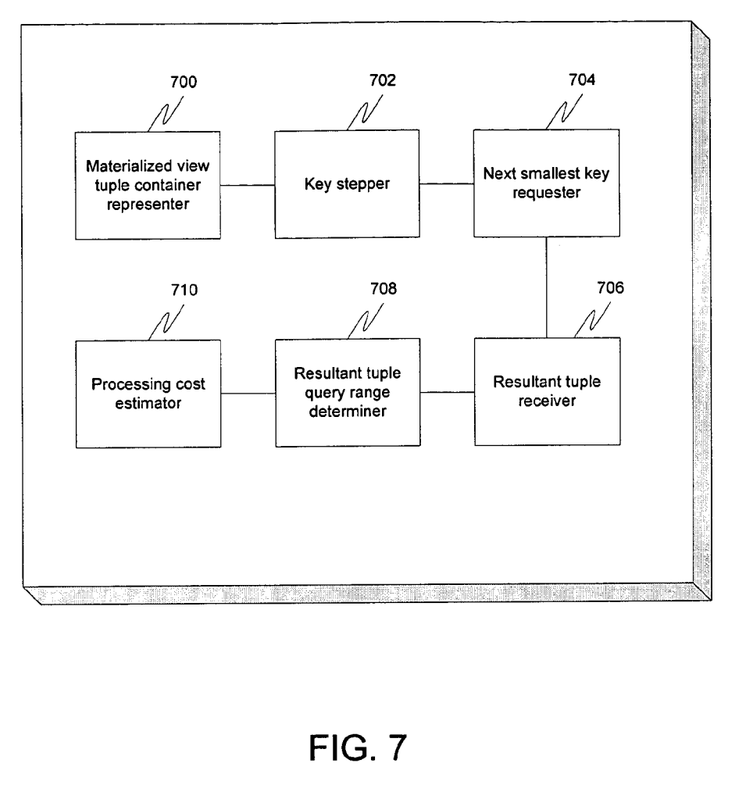
FIG. 7 is a block diagram illustrating an apparatus for estimating processing cost for a query on a multidimensional cube, the query having a query range, in accordance with an embodiment of the present invention.

FIG. 7 is a block diagram illustrating an apparatus for estimating processing cost for a query on a multidimensional cube, the query having a query range, in accordance with an embodiment of the present invention. Each element of the apparatus may be embodied in software, hardware, or any combination thereof. A materialized view tuple container representer 700 may represent a materialized view of the multidimensional cube as a container of tuples sorted by key, each of the keys representing a mapping of a combination of tuples. The container may be a B-tree. Each member in each dimension of the multidimensional cube may have a unique member number, and the keys may be binary integers constructed from bits of member numbers. A key stepper 702 coupled to the materialized view tuple container representer 700 may set a key of a current step to the smallest key in the query range. A next smallest key requester 704 coupled to said key stepper 702 may request a next smallest key in the query range greater than or equal to the key of the current step. A resultant tuple receiver 706 coupled to the next smallest key requester 704 may then receive the resultant tuple in the tuple in the database with the smallest key that is greater than or equal to the key of the current step. A resultant tuple query range determiner 708 coupled to the resultant tuple receiver 706 may determine if the resultant tuple is in the query range. It may then be determined if the resultant tuple is the last key for the materialized view. If not, then the process may step to the next key in the query range and repeat. If so, then a processing cost estimator 710 coupled to the resultant tuple query range determiner 708 may estimate the processing cost for the query as equal to the number of tuples upon which the determining was performed.

Figure 8:
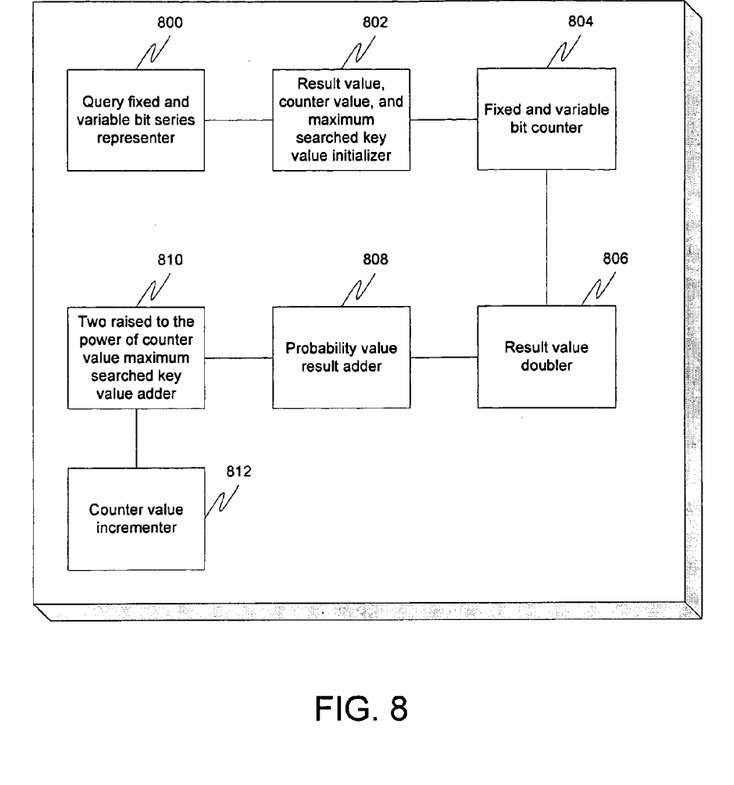
FIG. 8 is a block diagram illustrating an apparatus for estimating processing cost for a query on a multidimensional cube in accordance with another embodiment of the present invention.

FIG. 8 is a block diagram illustrating an apparatus for estimating processing cost for a query on a multidimensional cube in accordance with another embodiment of the present invention. Each element of the apparatus may be software, hardware, or a combination thereof. A query fixed and variable bit series representer 800 may represent the query as a series of fixed and variable bits, the series having a series length. A result value, counter value, and maximum searched key value initializer 802 coupled to the query fixed and variable bit series representer 800 may initialize a result value, counter value, and maximum searched key value. Then, a fixed and variable bit counter 804 coupled to the result value, counter value, and maximum searched key value initializer 802 may count though each fixed and variable bit. It may first be determined if the counter value is equal to the total number of fixed and variable bits in the query. If so, the loop may end. If not, then if the bit corresponding to the counter value is variable, a result value doubler 806 coupled to the fixed and variable bit counter 804 may multiply the result value by two. A probability value result adder 808 coupled to the result value doubler 806 may add a probability value to the result, the probability value representing a probability that a tuple occurs in a range between the maximum searched key value and two raised to the power of the series length, the tuple representing numbers constructed from member numbers corresponding to members in the multidimensional cube. The probability value may be based on the number achieved by subtracting the maximum searched key from two raised to the power of the counter value. Then, a two raised to the power of counter value maximum searched key value adder 810 coupled to the probability value result adder 808 may add two raised to the power of the counter value to the maximum searched key value. Then, a counter value incrementer 812 coupled to the two raised to the power of counter value maximum searched key value adder 810 may add one to the counter value.

Once the loop is complete, a query processing cost result estimator 814 coupled to the counter value incrementer 812 may estimate the processing cost of the query at one plus the result value produced by the loop.

Figure 9:
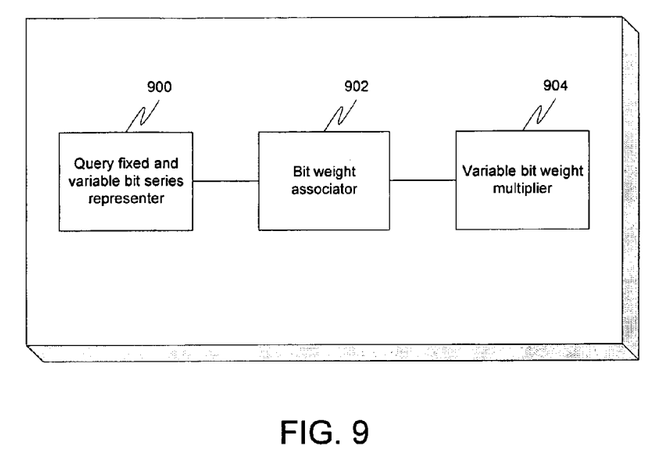
FIG. 9 is a block diagram illustrating an apparatus for estimating processing cost for a query on a multidimensional cube in accordance with still another embodiment of the present invention.

FIG. 9 is a block diagram illustrating an apparatus for estimating processing cost for a query on a multidimensional cube in accordance with still another embodiment of the present invention. Each element of the apparatus may be software, hardware, or a combination thereof. A query fixed and variable bit series representer 900 may represent the query as a series of fixed and variable bits. Then, a bit weight associator 902 coupled to the query fixed and variable bit series representer 900 may associate a weight with each bit of the series, the weight representing an approximation of an expected number of ranges, out of total ranges corresponding to the bit, that are filled in the multidimensional cube. The total number of ranges corresponding to a bit may be based on bit position. It may be equal to an effective bucket count corresponding to the bit. The effective bucket count for a bit may be equal to an effective bucket count for a previous bit, such as a next most significant bit of the series, multiplied by an effective bucket count multiplier. In a basic embodiment, the effective bucket count multiplier may simply be 2. In a grouping capacity embodiment, the effective bucket count multiplier may be equal to 2 divided by the nth root of m, wherein n is equal to a number of bits in the key which are given to each grouping in a dimension, and m is equal to an average number of members in each of the groupings. In a bit count embodiment, the effective bucket count multiplier may be equal to m divided by the maximum of c and m−c, wherein m is equal to a number of level 0 members in the multidimensional cube, and c is equal to a count c incremented by one for each level 0 member for which the corresponding bit of the series was set. The approximation of an expected number of ranges, out of total ranges corresponding to the bit, that are filled in the multidimensional cube may be equal to Cardenas' formula applied to an effective bucket count raised to the power of one plus a bit number for the bit, divided by Cardenas' formula applied to an effective bucket count raised to the power of said bit number for the bit. A variable bit weight multiplier 904 coupled to the bit weight associator 902 may multiply together the weights associated with each of the variable bits to arrive at an estimated processing cost for the query.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
   estimating processing cost for a query on a multidimensional cube, the query having a query range, by:
   representing a materialized view as a container of tuples;
   wherein each tuple in the materialized view corresponds to a combination of dimension key values for which data exists in said multidimensional cube;
   wherein each tuple has a key that is generated based on the set of dimension key values that belong to the tuple;
   wherein the tuples are sorted by key;
   stepping through all keys for the query range, starting with a smallest key, said smallest key initially being established as a current key and then, at each step:
   establishing, as a new current key, a next smallest key that
   is in the query range, and
   is greater than or equal to the current key;
   after establishing the new current key, receiving a resultant tuple that is associated with a resultant key;
   wherein the resultant key is a key that
   corresponds to a tuple that exists in the materialized view, and
   is the smallest key, in the query range key, greater than or equal to the current key;
   processing said resultant tuple;
   establishing, as a new current key, a key that is incrementally greater than the resultant key; and
   estimating the processing cost for the query as equal to the number of tuples upon which said processing was performed during said stepping; and
   determining whether or not to materialize the query base upon the estimated processing costs.

2. The method of claim 1, wherein said container is a B-tree.

3. The method of claim 1, wherein each member in each dimension of the multidimensional cube has a unique member number.

4. The method of claim 3, wherein said keys are binary integers constructed from bits of member numbers.

5. A computer-readable storage medium storing instructions which, when executed by a processor, cause the processor to perform the steps of:
   estimating processing cost for a query on a multidimensional cube, the query having a query range, by:
   representing a materialized view as a container of tuples;
   wherein each tuple in the materialized view corresponds to a combination of dimension key values for which data exists in said multidimensional cube;
   wherein each tuple has a key that is generated based on the set of dimension key values that belong to the tuple;
   wherein the tuples are sorted by key;
   stepping through all keys for the query range, starting with a smallest key, said smallest key initially being established as a current key and then, at each step:
   establishing, as a new current key, a next smallest key that
   is in the query range, and
   is greater than or equal to the current key;
   after establishing the new current key, receiving a resultant tuple that is associated with a resultant key;
   wherein the resultant key is a key that
   corresponds to a tuple that exists in the materialized view, and
   is the smallest key, in the query range key, greater than or equal to the current key;
   processing said resultant tuple;
   establishing, as a new current key, a key that is incrementally greater than the resultant key; and
   estimating the processing cost for the query as equal to the number of tuples upon which said processing was performed during said stepping; and
   determining whether or not to materialize the query base upon the estimated processing costs.

6. The computer-readable storage medium of claim 5, wherein said container is a B-tree.

7. The computer-readable storage medium of claim 5, wherein each member in each dimension of the multidimensional cube has a unique member number.

8. The computer-readable storage medium of claim 7, wherein said keys are binary integers constructed from bits of member numbers.

* * * * *

UNITED STATES PATENT AND TRADEMARK OFFICE
CERTIFICATE OF CORRECTION

PATENT NO. : 7,392,242 B1
APPLICATION NO. : 10/863313
DATED : June 24, 2008
INVENTOR(S) : Baccash et al.

Page 1 of 1

It is certified that error appears in the above-identified patent and that said Letters Patent is hereby corrected as shown below:

On sheet 4 of 9, Figure 4, Box 412, line 2, after "cost" delete "fo" and insert -- of --, therefor.

In column 10, line 17, delete "though" and insert -- through --, therefor.

Signed and Sealed this

Seventh Day of July, 2009

JOHN DOLL
*Acting Director of the United States Patent and Trademark Office*